United States Patent [19]

Nagoshi

[11] Patent Number: 4,654,217
[45] Date of Patent: Mar. 31, 1987

[54] PROCESS FOR QUICK-FREEZING OF MEAT

[75] Inventor: Kazunori Nagoshi, Matsuyama, Japan

[73] Assignee: Tadaaki Sakai, Osaka, Japan

[21] Appl. No.: 759,130

[22] Filed: Jul. 24, 1985

[51] Int. Cl.$^4$ ............................. A23B 4/08; A23L 3/36
[52] U.S. Cl. ......................................... 426/524; 62/64
[58] Field of Search ..................... 426/524, 327; 62/64, 62/78; 252/68, 69

[56] References Cited

U.S. PATENT DOCUMENTS 3,520,812 7/1970 Ecklund ................................. 252/69
3,821,451 6/1974 Palyi ................................. 426/524 X

OTHER PUBLICATIONS

Hawley, *Condensed Chemical Dictionary*, 9th Ed., 1977, p. 743.

*Primary Examiner*—Arthur L. Corbin
*Attorney, Agent, or Firm*—Koda and Androlia

[57] ABSTRACT

A method of freezing meat such as beef, poultry, pork, etc. including the steps of cooling brine which includes rapeseed oil added into a solution of propylene glycol, calcium chloride and water and then immersing the meat into the cooled brine. The meat thus processed by the brine is frozen in freezing equipment.

5 Claims, 1 Drawing Figure

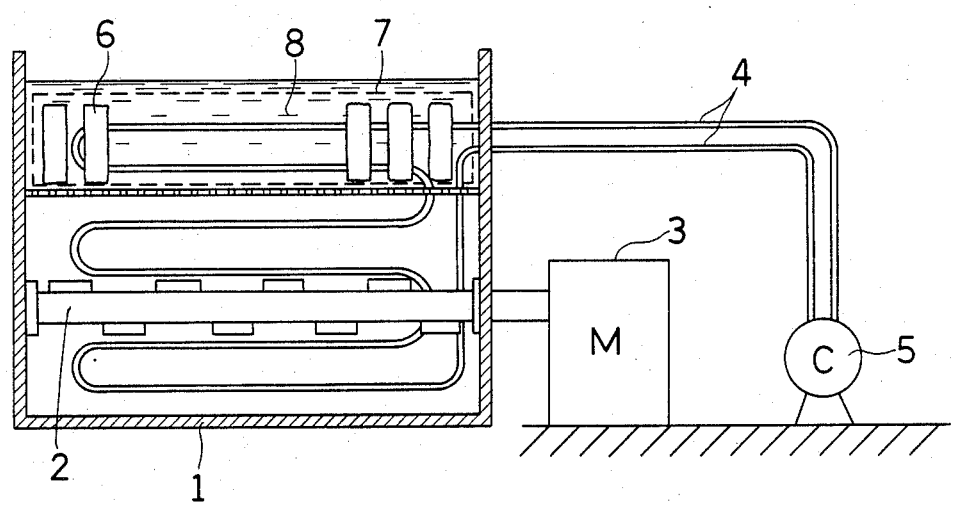

PROCESS FOR QUICK-FREEZING OF MEAT

BACKGROUND OF THE INVENTION

1. Field of the Invention

The present invention relates to a method of freezing meat including beef, pork, poultry and the like.

2. Prior Art

Conventionally meat is frozen by means of air or brine (antifreeze solution) and cooled by a cooling medium. Another method of freezing meat is by immersing it in liquid nitrogen or liquid carbon dioxide.

However, since the foregoing methods more or less drip a great deal the meat loses weight and the quality of the meat is lowered or flavor deterioration occurs.

The reason for such dripping is believed to be caused by the breakdown of muscle structure of the meat which is caused by ice crystals forming when the meat is frozen. This results in an increase in the salt concentration and has a relationship to the freezing rate.

The above method is disadvantageous in that production costs are higher since the use of liquid nitrogen is costly.

On the other hand, the brine method includes inorganic brine such as calcium chloride and organic brine such as ethylene glycol, propylene glycol, etc. Furthermore, the solution is prepared by mixing them and produces, advantageously, greater cooling at a comparatively lower price.

SUMMARY OF THE INVENTION

In view of the above, the purpose of the present invention is to provide a method for freezing meat which prevents deterioration of the quality of the meat and controls the occurrence of drip through an improvement in the brine, which also is lower in cost.

As a result of continuous study, the inventor has discovered that when rapeseed oil is added to brine, the freezing rate and, in addition, the thawing rate of the meat are considerably increased.

In keeping with the principles of the present invention, the objects accomplished via a unique method of freezing meat including cooling brine which is prepared by adding rapeseed oil to a solution including propylene glycol, calcium chloride and water and subsequently, immersing the meat in the thus prepared brine for freezing.

No matter what amount of rapeseed oil is added, it will properly meet the requirements of the present invention provided it is within a range which makes it possible to control the rise of the liquid's temperature when immersing the meat in the brine, the most effective concentration being 0.1 to 0.5% by weight.

BRIEF DESCRIPTION OF THE DRAWING

The drawing is a typical view of a freezing device which puts the present invention into practice.

DETAILED DESCRIPTION OF THE INVENTION

Cooling brine to which rapeseed oil has been added can cause fine ice crystals to form, resulting in the ice crystals being uniformly distributed.

If the meat is immersed in brine when it is in the above described state, the freezing rate is increased and the freezing time is considerably reduced in comparison with brine to which no rapeseed oil has been added. Even after putting the meat into the brine, the temperature of the liquid does not increase, staying approximately constant.

When meat frozen by the method of the present invention is thawed, the thawing time can be reduced to a great extent.

The reason for such a marked increase in the freezing rate is that the ice crystals caused by the addition of rapeseed oil become of supply source of freezing latent heat to the meat. As a result, a rise in temperature of the liquid is prevented, and the meat passes promptly into the zone of maximum ice crystal formation ($-0.5°$ C. to $-5°$ C.). Thus, generation of large ice crystals as well as deterioration of the quality of the meat can be prevented.

Furthermore, although the process of thawing the meat is not clarified, prompt thawing can prevent the growth of ice crystals so that breakdown of the meat's structure is also prevented.

Referring first to the drawing which illustrates a freezing device for putting the present invention into practice, in a typical manner, numeral 1 is a tank, 2 is a stirring axis, 3 is a motor for driving the stirring axis 2, 4 is piping arranged in the tank 1, 5 is a compressor and 6 is a basket for holding the piece of meat 7.

The tank 1 is filled with brine 8 and the basket 6 is fully immersed in the brine 8. The brine 8 is cooled by a cooling medium which circulates through the piping 4, while repeating compression, liquefaction and evaporation by means of the compressor 5.

The meat is frozen by immersing the basket 6 in which the meat 7 has been placed into the brine 8 for a predetermined period of time and subsequently removing the basket 6 containing the meat 7 therefrom.

The brine, which is cooled from $-30°$ C. to $-42°$ C., has a slight amount of rapeseed oil added to it, the brine includinng propylene glycol (40% in weight), calcium chloride (10%) and water (50%).

Table 1 shows the results obtained by an experiment in which the amount of the rapeseed oil added to brine is varied.

The experiment was performed under the following conditions. The temperature of the brine was $-35°$ C., beefsteaks about 20 mm thick were used as the meat piece 7 and the beafsteaks lined the basket 6 at intervals of about 10 mm.

TABLE 1

| Amount of Rapeseed Oil Added (%) | Freezing Time (min) | Thawing Time (min) | Amount of Drip |
|---|---|---|---|
| 0 | 20 | 20 | large |
| 0.05 | 15 | 16 | slight |
| 0.1 | 10 | 10 | nil |
| 0.5 | 10 | 10 | nil |
| 1.0 | 12 | 13 | slight |

As shown in Table 1, if the amount of rapeseed oil added is within 0.1 to 0.5%, favorable results are obtained. Meat which is frozen with brine to which rapeseed oil has been added in the aforestated range remains good tasting and fresh.

On the other hand, an organoleptic test, performed while the meat is frozen, shows that frozen meat to which no rapeseed oil has been added has numerous ice crystals radially extending from its center on the surface thereof. This phenomenom is believed to cause drip. In contrast thereto, frozen meat to which rapeseed oil has been added has one thick ice crystal linearly extending or in a folded manner toward the surface thereof and almost all of the structure of the meat is normal.

Since the present invention does not use expensive liquid nitrogen, etc. but rather uses economical and inexpensive brine and rapeseed oil, the cost of producing frozen meat can be lowered.

Furthermore, since the brine containing rapeseed oil remarkably reduces freezing and thawing time, deterioration of the quality of the meat can be prevented. Thus, the time necessary to produce frozen meat can be reduced and the present invention advantageously provides quicker production of frozen meat and improved quality.

I claim:

1. A method of quick freezing meat comprising cooling brine prepared by adding rapeseed oil to a solution of propylene glycol, calcium chloride and water, and subsequently immersing meat in said brine.

2. A method of freezing meat comprising:
    cooling brine prepared by adding rapeseed oil into a solution which includes propylene glycol, calcium chloride and water;
    immersing meat in said brine; and then
    freezing said meat while in said brine in a freezing apparatus.

3. A method of claim 2, wherein said rapeseed oil is present in an amount of 0.1 to 0.5% by weight in said brine.

4. A method of claim 2, wherein said brine is cooled at a temperature of $-30°$ C. to $-42°$ C.

5. A method of claim 2, wherein said solution comprises 40% by weight of propylene glycol, 10% by weight of calcium chloride and 50% by weight of water.

* * * * *